United States Patent
Wang et al.

(10) Patent No.: US 8,885,086 B2
(45) Date of Patent: Nov. 11, 2014

(54) CAMERA DEVICE AND PROJECTOR DEVICE HAVING PROTECTIVE LENS

(71) Applicant: Tera Xtal Technology Corporation, Hsinchu (TW)

(72) Inventors: Wei-Hsiang Wang, Hsinchu (TW); Chen-Hui Wu, Hsinchu (TW)

(73) Assignee: Tera Xtal Technology Corporation, Hsinchu (TW)

( * ) Notice: Subject to any disclaimer, the term of this patent is extended or adjusted under 35 U.S.C. 154(b) by 16 days.

(21) Appl. No.: 13/794,672

(22) Filed: Mar. 11, 2013

(65) Prior Publication Data
US 2014/0168493 A1    Jun. 19, 2014

(30) Foreign Application Priority Data
Dec. 19, 2012   (CN) .......................... 2012 1 0554918

(51) Int. Cl.
*H04N 5/225* (2006.01)
*G02B 5/30* (2006.01)
*G02B 27/46* (2006.01)

(52) U.S. Cl.
CPC ............ *H04N 5/2254* (2013.01); *G02B 5/3083* (2013.01); *G02B 27/46* (2013.01)
USPC ...................... 348/335; 359/489.14; 359/356

(58) Field of Classification Search
None
See application file for complete search history.

(56) References Cited

U.S. PATENT DOCUMENTS

| | | | |
|---|---|---|---|
| 2003/0214729 A1* | 11/2003 | Wiese et al. ................... | 359/754 |
| 2004/0061947 A1* | 4/2004 | Fujisawa et al. .............. | 359/642 |
| 2008/0218597 A1* | 9/2008 | Cho .......................... | 348/222.1 |
| 2009/0310229 A1* | 12/2009 | Yang et al. ..................... | 359/694 |
| 2012/0001072 A1* | 1/2012 | Toda et al. ............... | 250/339.05 |
| 2012/0113401 A1* | 5/2012 | Yamazaki et al. ............ | 353/101 |
| 2012/0314114 A1* | 12/2012 | Migita et al. .............. | 348/333.1 |
| 2013/0162891 A1* | 6/2013 | Wang et al. .................. | 348/360 |
| 2014/0009662 A1* | 1/2014 | Toda et al. .................... | 348/336 |

\* cited by examiner

*Primary Examiner* — Lin Ye
*Assistant Examiner* — John H Morehead, III (57) ABSTRACT

A camera device includes a lens module and a birefringent sapphire lens. The sapphire lens is coupled to the lens module as a light window to protect the lens module. The sapphire lens has a crystal structure and a crystal axis. The crystal structure is a single-crystal structure and the crystal axis is one of c-axis (0001), a-axis [including ($1\bar{2}10$), ($11\bar{2}0$), ($2\bar{1}\bar{1}0$), ($\bar{1}\bar{1}20$), ($\bar{2}110$) and ($\bar{1}2\bar{1}0$)], m-axis [including ($\bar{1}010$), ($\bar{1}100$), ($01\bar{1}0$), ($10\bar{1}0$), ($1\bar{1}00$), and ($0\bar{1}10$)], and r-axis [including ($10\bar{1}1$), ($\bar{1}01\bar{1}$), ($01\bar{1}\bar{1}$), ($0\bar{1}11$), ($1\bar{1}0\bar{1}$) and r-axis ($\bar{1}101$)].

9 Claims, 7 Drawing Sheets

CAMERA DEVICE AND PROJECTOR DEVICE HAVING PROTECTIVE LENS

CROSS-REFERENCES TO RELATED APPLICATIONS

This application claims the priority of Chinese patent application No. 201210554918.1, filed on Dec. 19, 2012, which is incorporated herewith by reference.

BACKGROUND OF THE INVENTION

1. Field of the Invention

The present invention relates to a camera device and a projector device, especially relates to a camera device and a projector device having a protective lens.

2. The Prior Arts

As the image capturing technology advances, the conventional film camera devices have been replaced by digital cameras, and as the resolution of the digital cameras enhances, the size of the sensing components also becomes smaller. The unit pixels of sensing elements (such as charge-coupled device, CCD, or complementary metal-oxide-semiconductor, CMOS) are arranged in arrays. When the object being filmed has a regular spatial frequency, and when the spatial frequency is larger or equal to half of the sampling frequency of sensing elements, aliasing effect can occur, and further causing the phenomenon of moiré patterns. This effect is not seen in the conventional film camera. The moiré patterns are most likely to be seen in the pictures taken by low grade digital cameras, especially when the objects being filmed are hair or neckties with diagonal stripes. When filming such objects, moiré patterns are more likely to occur in the detailed portion of the picture, thereby resulting in defects or color differences in a photo.

In order to solve the abovementioned problems, quartz is usually used as a birefringent crystal to refract light within the light path in a conventional camera device. The quartz utilized generates two refracted light beams with a difference in their optical path, and the two refracted light beams enter its corresponding unit pixel respectively to eliminate the aliasing effect. However, the quartz has a relatively low rigidity in comparison to sapphire, therefore is not suitable to be placed outside the lens. Besides, placing the quartz in the light path can result in a bulky camera device; therefore, it is only used in the high-end SLR cameras or high-end digital cameras.

Figure 1:
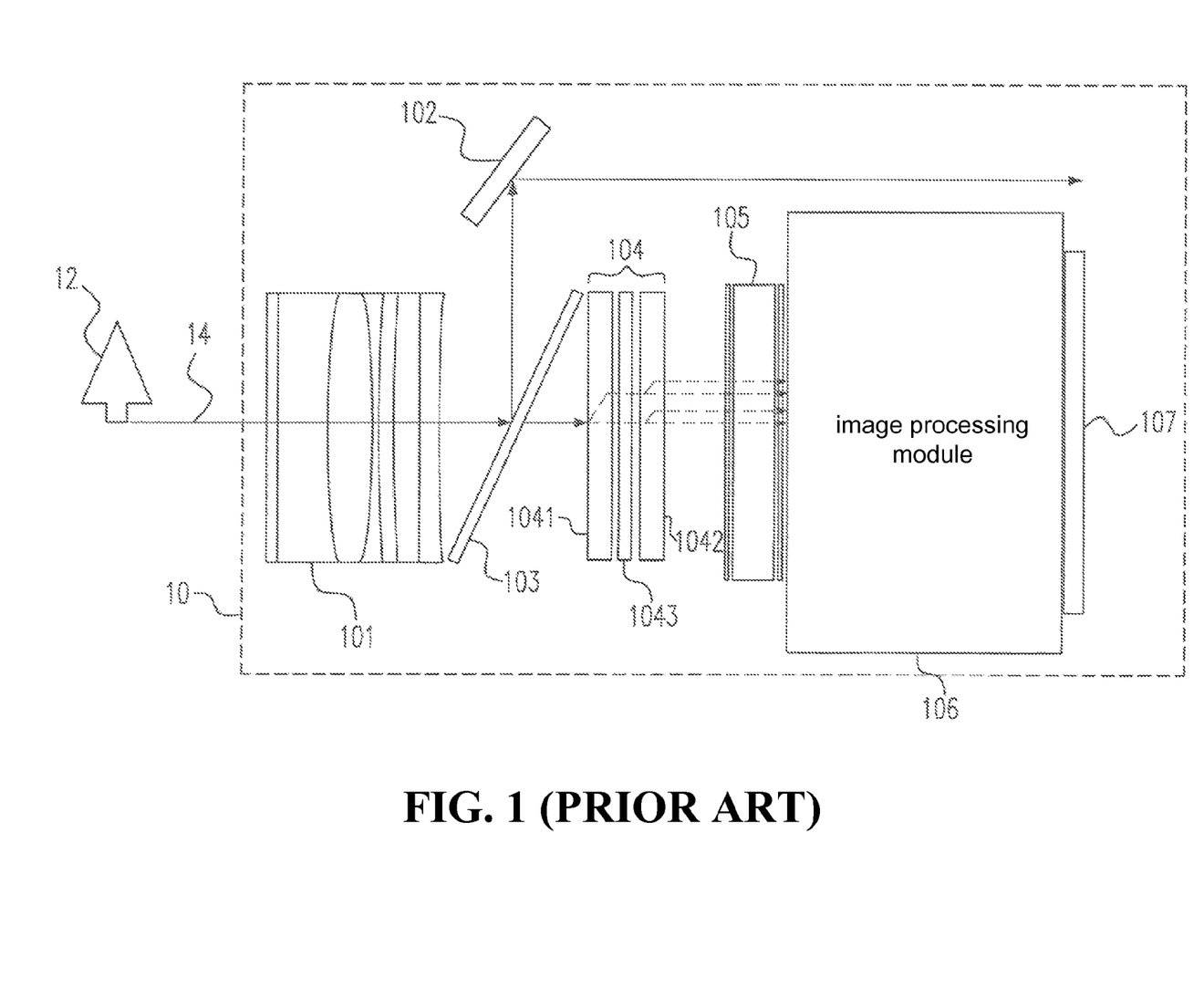
FIG. 1 is a schematic view illustrating a conventional high-end digital camera device (Prior Art)

FIG. 1 is the schematic view illustrating a conventional high-end digital camera device 10. As shown in FIG. 1, the conventional high-end digital camera device includes an optical lens 101, a reflex lens 102, a lens shutter 103, a low pass filter 104, a CMOS image sensing component 105, an image processing module 106, and a liquid crystal display (LCD) 107. The low pass filter 104 also includes a first birefringent lens 1041, a second birefringent lens 1042 and an infrared filter 1043 to block the infrared ray.

The light 14 reflected by an object 12 enters the optical lens 101, and then is reflected by the lens shutter 103 to enter the reflex lens 102. The direction of the light path of the light 14 is then changed, so the direction of the imaging of the object 12 is corrected. When the operator finishes the focusing and setting up the shutter time and the aperture size, the shutter button is pushed to open the lens shutter 103, so that the light 14 can pass through and reaches the low pass filter 104 and sensing component 105 in the rear end. Upon receiving, the sensing component 105 transforms the light 14 into a digital signal, and then the digital signal is processed by the image processing module 106 to output an image to the LCD display 107 for displaying.

In FIG. 1, the first birefringent lens 1041 and the second birefringent lens 1042 are made with quartz, and each lens only has a single light axis. When the light 14 enters the first birefringent lens 1041 and the direction of the light path is not parallel to the single light axis of the first birefringent lens 1041, two refracted light are formed. One of the refracted lights is refracted according to the law of refraction, and is called the ordinary light. The other one of the refracted lights is not refracted according to the law of refraction, therefore is called the extraordinary light. The light 14 is refracted into two parallel lights via the first birefringent lens 1041, so two images offset from each other are formed. Similarly, each of the parallel light is again refracted into two parallel lights via the second birefringent lens 1042, thereby forming more offset images. For the matter of convenience, the ordinary light refracted by the first birefringent lens 1041 is shown as broken lines that are parallel to the light 14 in FIG. 1. The infrared filter 1043 is usually made from a blue glass containing cobalt. The surface of the blue glass is electroplated to block the infrared ray, so as to serve as an infrared filter. Most of the small cameras are not equipped with such components as the infrared filter 1043 because only the high-end cameras have the space and the cost to do so. The low pass filter 104 shown in FIG. 1 is one of the various forms. The optical low pass filter 104 can also be one with single-lens or multiple lenses.

Figure 2:
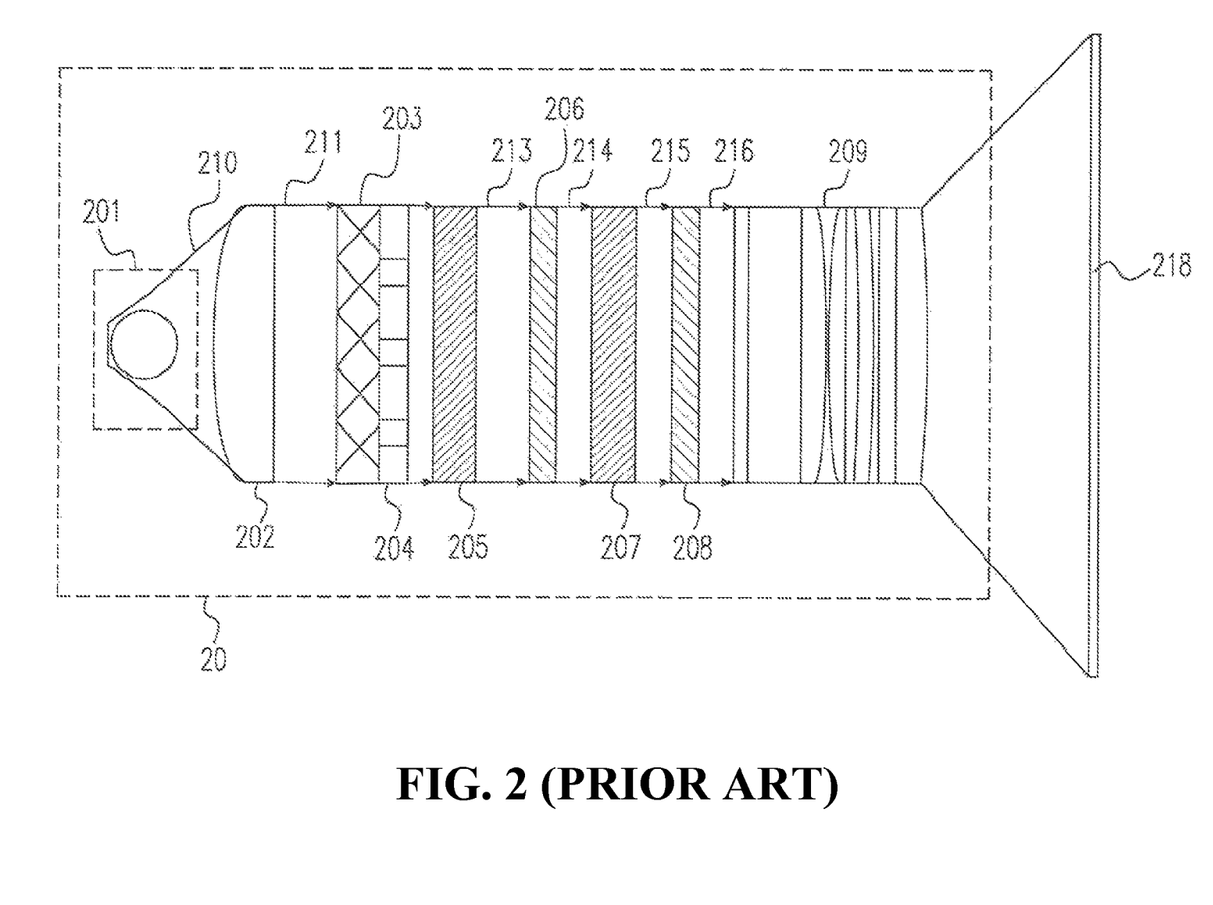
FIG. 2 is a schematic view illustrating a conventional liquid crystal projector device (Prior Art)

FIG. 2 is a schematic view illustrating a conventional liquid crystal projector device 20. The conventional liquid crystal projector device 20 includes a light source assembly 201, a condensing lens 202, a liquid crystal assembly 203, a color filter 204, a ¼ wavelength polarizer 205 and 207, birefringent crystal 206 and 208, and lens assembly 209. The light beam 210 illuminated by the light source assembly 201 enters the condensing lens 202, and is condensed to a certain area. The condensed light beam 210 then enters the liquid crystal assembly 203, which has multiple unit pixels, in which, the brightness of each of the unit pixels is controlled by a control signal (not shown). After the liquid crystal assembly 203 adjusted the brightness of the light beam 211, the light beam 211 then enters the color filter 204, which controls the color of each unit pixel. The delicacy of the color depends on the size of the unit pixel, where the smaller the unit pixels are, the higher the quality of the color becomes.

After passing through the color filter 204, the light beam 211 enters the ¼ wavelength polarizer 205 so as to be transformed into a polarized light beam 213. The polarized light beam 213 then enters the birefringent crystal 206, and is refracted into a birefringent light beam 214. The birefringent light beams 214 are the ordinary light and extraordinary light, which are parallel to each other. Next, the birefringent light beam 214 enters another ¼ wavelength polarizer 207 so as to be transformed into another polarized light beam 215. The polarized light beam 215 then enters yet another birefringent crystal 208, and is refracted into another birefringent light beam 216. With the birefringence property, the birefringent crystal 206 is designed in such a manner that the difference in the optical path created is equal to the distance between the unit pixels, and so is the birefringent crystal 208. In this way, a unit pixel is split into two or four unit pixels to enhance the output image. At last, the birefringent light beam 216 is projected onto a screen 218 via the lens assembly 209 to enlarge the final image.

The birefringent crystal 206 and 208 utilized in the conventional projector eliminates the aliasing effect and hence improves the moiré patter with its birefringence characteristics. The ¼ wavelength polarizer is also used to form the polarized light or to filter the reflected light with its polarizing characteristics. However, just like the first birefringent lens 1041 and the second birefringent lens 1042 in FIG. 1, the birefringent crystal 206 and 208 and the ¼ wavelength polarizer 205 and 207 are not easy to fit into the device when manufacturing the projectors with smaller sizes. The birefringent crystal 206 and 208 and the ¼ wavelength polarizer 205 and 207 are also not suitable to be placed outside the projector due to its low rigidity. Therefore, a new product, which has a smaller size while having all the above advantages is yet to be developed; such new product can be installed in a slim and light camera device or projector device to solve the drawbacks of the conventional devices.

SUMMARY OF THE INVENTION

Due to the above reasons, the primary purpose of the present invention is to redesign the camera device and the projector device with the birefringent sapphire crystal. With the property of birefringence, and also with the characteristic of anti-corrosion, high compressive strength and high rigidity of the sapphire crystal, it is utilized as the protective lens directly. In addition, due to its birefringence property, the sapphire crystal is optically designed and coated to serve both roles of protective lens and optical filter. In this way, the polarizer and the filter in the optical lens assembly are omitted to lower the cost and also reduce the size of the product. With the sapphire lens, both the functionality and the reliability of the product are ensured.

The sapphire crystal is a birefringent crystal with specific axial directions and is suitable to use as a viewing window. Due to its hexagonal crystal structure, when making use of the sapphire crystal, different axial directions of the crystal are chosen according to the reflection angle needed, so the desired effect can be achieved along with right choice of the sapphire crystal thickness. For example, c-axis, a-axis, r-axis and m-axis are used as light windows. With the birefringence property, the right design of the crystal thickness, and the coordination of the sensing components/projector light source and the image processing module, better imaging results are obtained.

According to the above description, a camera device is provided in the present invention, includes a lens module and a sapphire lens. The birefringent sapphire lens is coupled to the lens module to serve as a light incident window and to protect the lens module. The sapphire lens has a crystal structure and a crystal axis, where the crystal structure is a single-crystal structure, and the crystal axis includes one selected from a group consisting of c-axis (0001), a-axis [including (1 $\bar{2}$10), (11$\bar{2}$0), (2$\bar{1}\bar{1}$0), ($\bar{1}\bar{1}$20), ($\bar{2}$110) and ($\bar{1}$2$\bar{1}$0)], m-axis [including ($\bar{1}$010), ($\bar{1}$100), (01$\bar{1}$0), (10$\bar{1}$0), ($\bar{1}$100), and (0$\bar{1}$10)], and r-axis [including (10$\bar{1}$1), ($\bar{1}$01$\bar{1}$), (01$\bar{1}\bar{1}$), (0$\bar{1}$11), (1$\bar{1}$0$\bar{1}$) and r-axis ($\bar{1}$101)].

According to the above description, a camera device is provided in the present invention, includes a lens module and a rotatable protective light window. The rotatable protective light window is rotatably coupled to the lens module to protect the lens module. When the rotatable protective light window and the lens module are at a first relative position, the lens module fetches a specific reflected light. On the other hand, when the rotatable protective light window and the lens module are at a second relative position, the lens module prevents the specific reflected light from entering into the camera device.

According to the above description, a projector device is provided in the present invention, includes a light source, a lens module and a rotatable protective light window. The lens module is illuminated by the light source to generate a working light beam. The rotatable protective light window has the birefringence property, and is coupled to the lens module to serve as a light exit window to protect the lens module. Besides, the rotatable protective light window also receives the working light beam to generate a birefringent light beam.

According to the above description, a camera device is provided in the present invention, includes a lens module and a birefringent lens. The birefringent lens is coupled to the lens module so as to receive an incident light beam and also to split the incident light beam into an ordinary light and an extraordinary light. Under such condition, the resolution of the camera device is enhanced.

The present invention utilizes the sapphire light window on the outer surface of the devices, so the sapphire serves as the protective window and the optical window. With its birefringence characteristic, the excellent mechanical properties and proper optical design, the final imaging produced by the sapphire is much better than the results from conventional devices.

DETAILED DESCRIPTION OF THE PREFERRED EMBODIMENTS

The present invention will be apparent to those skilled in the art by reading the following detailed description of preferred embodiments thereof, with reference to the attached drawings.

Figure 3:
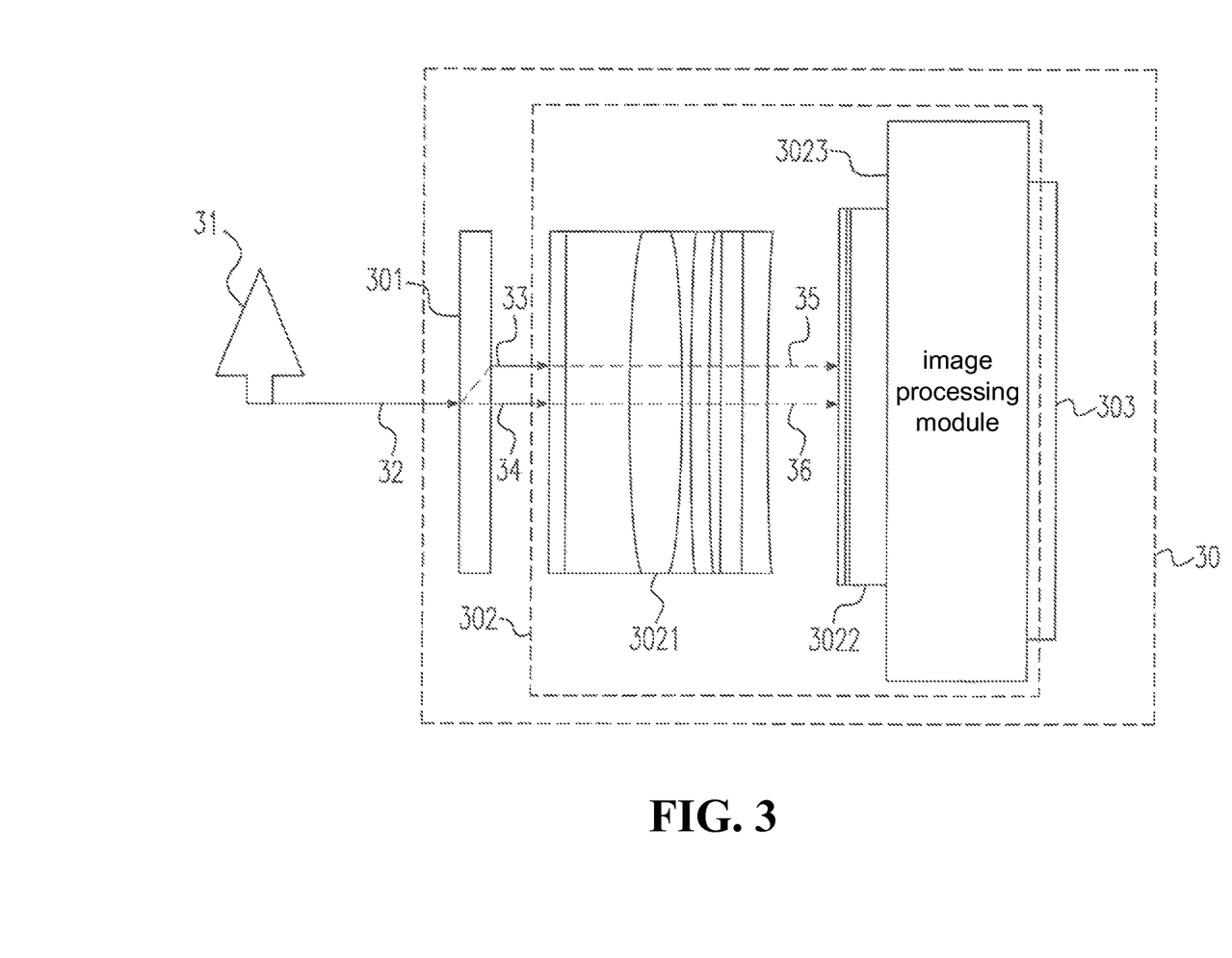
FIG. 3 is a schematic view illustrating a first embodiment of a camera device of the present invention.

FIG. 3 is the schematic view illustrating the first embodiment of the camera device of the present invention. As shown in FIG. 3, the camera device 30 of the present invention includes a sapphire lens 301, a lens module 302 and a flat panel display 303, where the sapphire lens 301 is a light window. The birefringent sapphire lens 301 is coupled to the lens module 302 to serve as a light incident window and also to protect the lens module 302. The sapphire lens 301 has a crystal structure and a crystal axis, where the crystal structure is a single-crystal structure, and the crystal axis includes one selected from a group consisting of c-axis (0001), a-axis [including (1$\bar{2}$10), (11$\bar{2}$0), (2$\bar{1}\bar{1}$0), ($\bar{1}\bar{1}$20), ($\bar{2}$110) and ($\bar{1}$2$\bar{1}$0)], m-axis [including ($\bar{1}$010), ($\bar{1}$100), (01$\bar{1}$0), (10$\bar{1}$0), ($\bar{1}$100), and (0$\bar{1}$10)], and r-axis [including (10$\bar{1}$1), ($\bar{1}$01$\bar{1}$), (01$\bar{1}\bar{1}$), (0$\bar{1}$11), (1$\bar{1}$0$\bar{1}$) and r-axis ($\bar{1}$101)]. In addition to the strong mechanical strength, scratch-resistance and corrosion-resistance characteristics, the rigidity of the sapphire is also very high and is only next to the diamonds. Hence, the sapphire is a suitable material for the protective lens of the camera device 30.

In FIG. 3, the incident light 32 from an object 31 includes the sapphire lens 301. The sapphire lens 301 has two optical axes including the c-axis (0001). When designing the sapphire lens 301, the axial direction of the two optical axes are not to be parallel with the incident direction of the incident light 32. When the incident direction of the incident light 32 is not parallel to the optical axis of the sapphire lens 301, the incident light 32 is refracted by the sapphire lens 301 into a first refracted light beam 33 and a second refracted light beam 34, which are offset and parallel to each other.

The lens module 302 includes an optical lens 3021, an image sensing unit 3022 and an image processing module 3023. The optical lens 3021 is coupled to the sapphire lens 301 to receive the first refracted light beam 33 and the second refracted light beam 34, so as to form two parallel light beams 35 and 36. The image sensing unit 3021 then transforms the two parallel light beams 35 and 36 into an electronic signal (not visible) for the image processing module 3023 to proceed with later processing.

The image processing module 3023 includes a circuit board (not visible) and a processor (not visible). The circuit board is electrically connected to the image sensing unit 3022. The processor is electrically connected to the circuit board to receive the electronic signal and transform it into an image signal. A flat panel display 303 is also electrically connected to the circuit, and is in response to the image signal to output a display image on the flat panel display 303.

The sapphire lens 301 has the birefringence characteristic, which is used to eliminate a moiré pattern and the aliasing phenomenon. In addition, the sapphire lens 301 is adapted to be disposed outside the lens module 302 to serve as the protective lens. Therefore, devices such as handheld devices are designed into a smaller and thinner form by implementing the sapphire lens 301 as the protective lens. While using the sapphire lens 301 as the protective lens, an infrared filter or an ultraviolet filter is placed between two pieces of sapphire lenses 301 to filter the undesired light rays.

Figure 4:
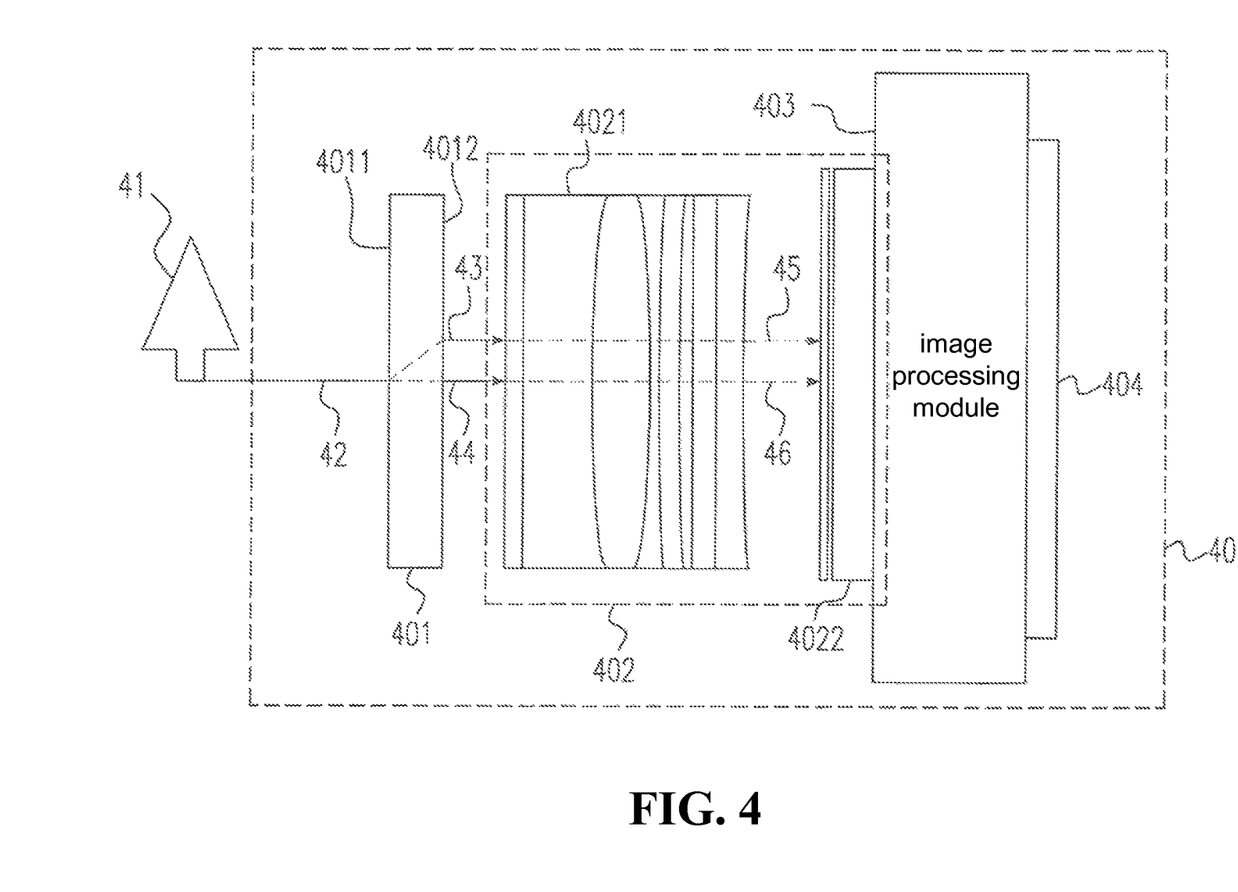
FIG. 4 is a schematic view illustrating a second embodiment of the camera device of the present invention.

FIG. 4 is the schematic view illustrating the second embodiment of the camera device 40 of the present invention. The camera device 40 includes a sapphire lens 401, a lens module 402, an image processing module 403 and a flat panel display 404. The sapphire lens 401 is coupled to the lens module 402 to serve as a light incident window and to protect the lens module 402.

Similar to the first embodiment, in FIG. 4, the incident light 42 from an object 41 includes the sapphire lens 401. The sapphire lens 401 has two optical axes including the c-axis (0001). When designing the sapphire lens 401, the axial direction of the two optical axes are not to be parallel with the incident direction of the incident light 42. When the incident direction of the incident light 42 is not parallel to the optical axis of the sapphire lens 401, the incident light 42 is refracted by the sapphire lens 401 into a first refracted light beam 43 and a second refracted light beam 44, which are offset and parallel to each other.

The lens module 402 includes an optical lens 4021 and an image sensing unit 4022. The optical lens 4021 is coupled to the sapphire lens 401 to receive the first refracted light beam 43 and the second refracted light beam 44, so as to form two parallel light beams 45 and 46. The image sensing unit 4021 then transforms the two parallel light beams 45 and 46 into an electronic signal (not visible) for an image processing module 403 to proceed with later processing.

The image processing module 403 includes a circuit board (not visible) and a processor (not visible). The circuit board is electrically connected to the image sensing unit 4022. The processor is electrically connected to the circuit board to receive the electronic signal and transform it into an image signal. A flat panel display 404 is also electrically connected to the circuit, and is in response to the image signal to output a display image on the flat panel display 404.

The sapphire lens 401 includes a first surface 4011 and a second surface 4012. An anti-reflective coating layer which includes a first semiconductor metal oxide is electroplated on the first surface 4011, where the first semiconductor metal oxide is silica or titanium dioxide. On the other hand, an infrared filter including a second semiconductor metal oxide is electroplated on the second surface 4012, where the second semiconductor metal oxide is silica, vanadium pentoxide, or tantalum pentoxide.

In another preferred embodiment, multiple coating layers are formed on the first surface 4011. For example, a fingerprint-resistant coating layer composed of a metal fluoride or a polymer fluoride is further coated on the anti-reflective coating layer, where the metal fluoride is magnesium fluoride or calcium fluoride.

Figure 5:
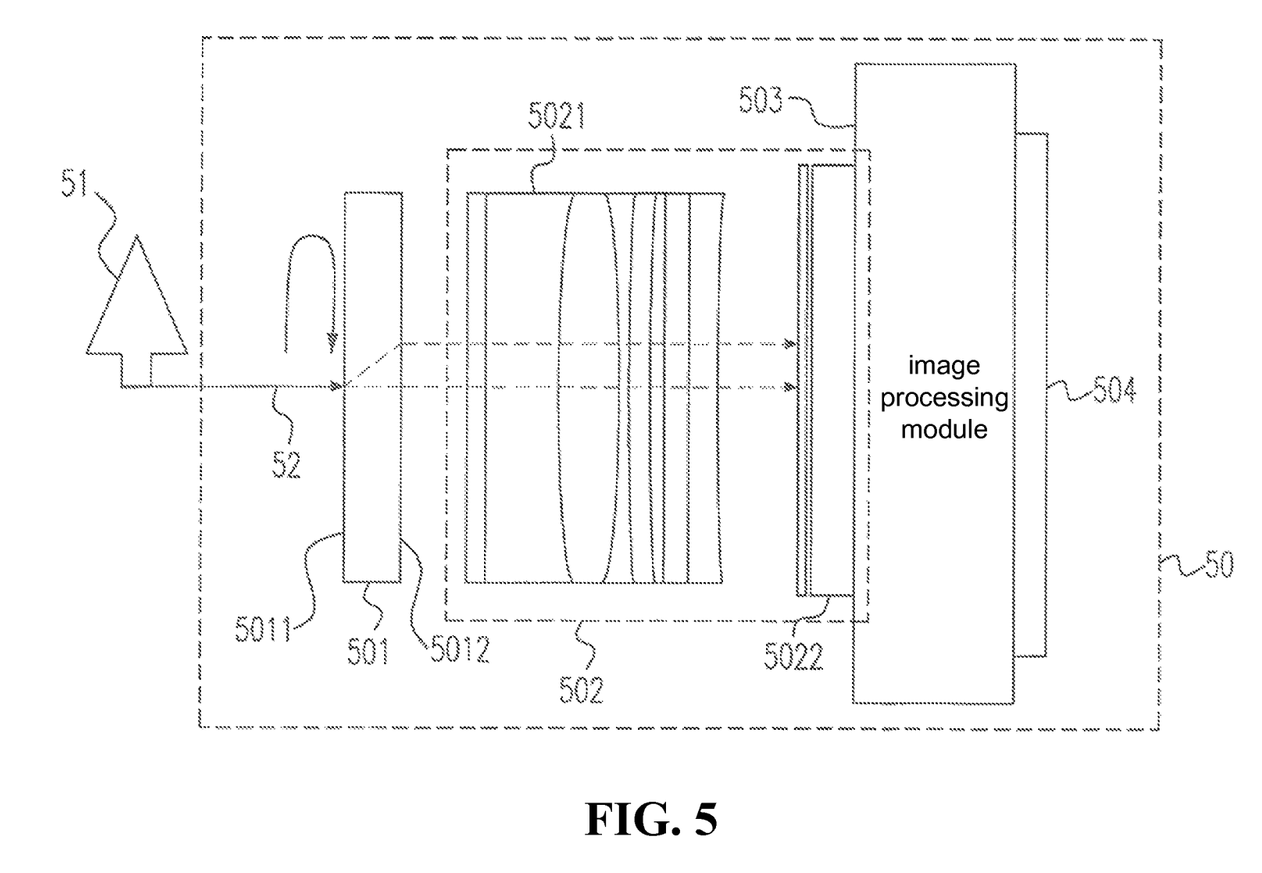
FIG. 5 is a schematic view illustrating a third embodiment of the camera device of the present invention.

FIG. 5 is the schematic view illustrating the third embodiment of the camera device 50 of the present invention. In FIG. 5, the camera device according to the first and second embodiment is improved. The camera device 50 includes a rotatable protective light window 501, a lens module 502, an image processing module 503 and a flat panel display 504. The lens module 502 includes an optical lens 5021 and an image sensing unit 5022. In another preferred embodiment, the lens module 502 includes only one optical lens 5021, while the camera device 50 further includes an image sensing unit 5022, which is coupled to the image processing module 503. The rotatable protective light window 501 is rotatably coupled to the lens module 502 to protect the lens module 502. When the rotatable protective light window 501 and the lens module 502 are at a first relative position, the lens module 502 fetches a specific reflected light 52. On the other hand, when the rotatable protective light window 501 and the lens module 52 are at a second relative position, the lens module 501 prevents the specific reflected light 52 from entering into the camera device 50. The rotatable protective light window 501 is a birefringent lens made from a sapphire, so the specific reflected light 52 from the object 51 is doubly refracted into an ordinary light and an extraordinary light. The shape of the rotatable protective light window 501 is a round flake. The specific reflected light 52 is reflected by a transparent glass or the water surface.

The rotatable protective light window 501 is a sapphire lens made from a sapphire. Similar to the first and second embodiments of the present invention, the sapphire lens has a crystal structure and a crystal axis. The crystal structure is a single-crystal structure, and the crystal axis includes one selected from a group consisting of c-axis (0001), a-axis [including (1$\bar{2}$10), (11$\bar{2}$0), (2$\bar{1}\bar{1}$0), ($\bar{1}\bar{1}$20), ($\bar{2}$110) and ($\bar{1}$2$\bar{1}$0)], m-axis [including ($\bar{1}$010), ($\bar{1}$100), (01$\bar{1}$0), (10$\bar{1}$0), (1$\bar{1}$00), and (0$\bar{1}$10)], and r-axis [including (10$\bar{1}$1), ($\bar{1}$01$\bar{1}$), (01$\bar{1}\bar{1}$), (0$\bar{1}$11), (1$\bar{1}$0$\bar{1}$) and r-axis ($\bar{1}$101)]. The sapphire lens includes a first surface 5011 and a second surface 5012. An anti-reflective coating layer is electroplated on the first surface 5011 with a fingerprint-resistant coating on top thereof, and an infrared filter is electroplated on the second surface 5012.

In the third embodiment of the present invention, the reflect direction of the reflected light 52 is changed by rotating the rotatable protective light window 501, which functions as a polarizer. With the rotatable protective light window 501 according to the third embodiment of the present invention, the irregular light beams are filtered and reflected into a directional polarized light beam.

Figure 6:
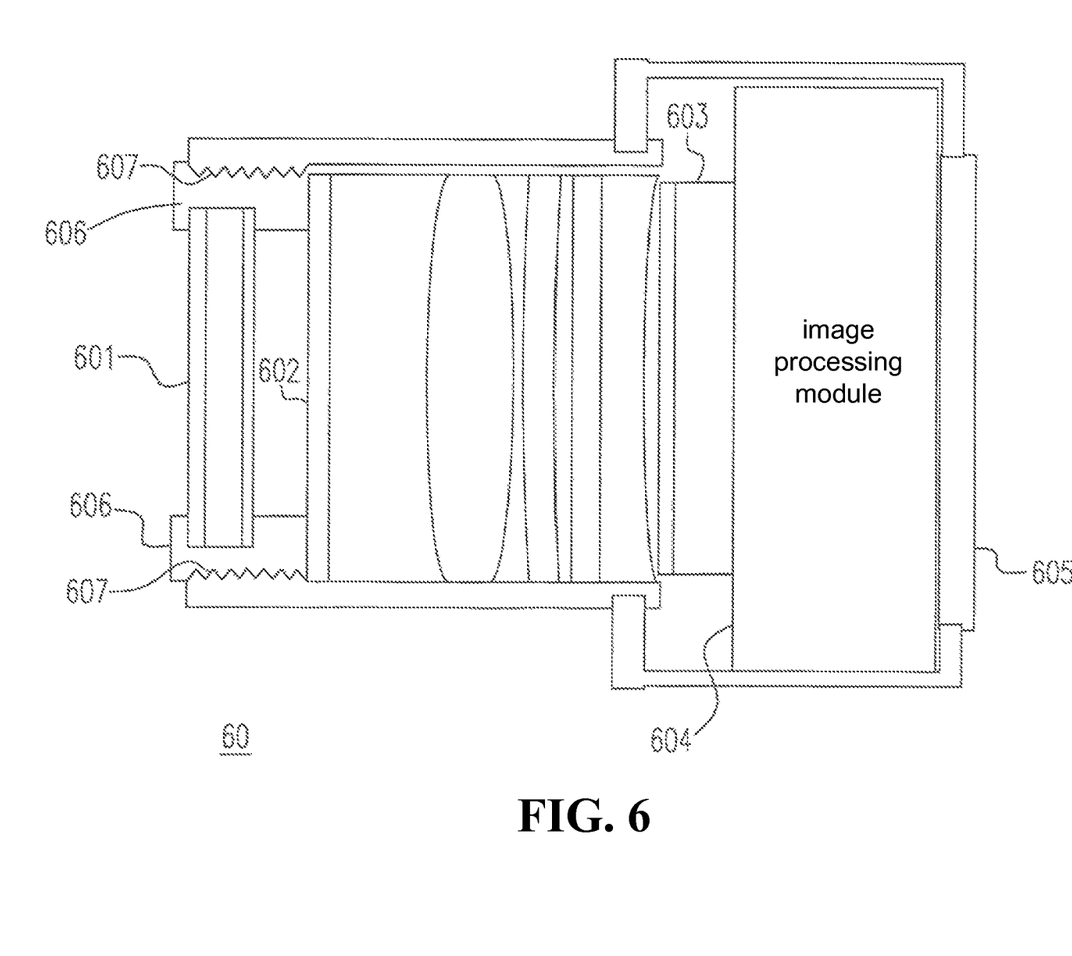
FIG. 6 is a schematic view illustrating a fourth embodiment of the camera device of the present invention.

FIG. 6 is the schematic view illustrating the fourth embodiment of the camera device 60 of the present invention. The camera device 60 includes a sapphire lens 601, an optical lens 602, an image sensing unit 603, an image processing module 604 and a flat panel display 605. The structure of the sapphire lens 601 is designed to be detachable and rotatable. The sapphire lens 601 in front of the optical lens 602 is rotated manually or driven by a motor (not shown) to automatically rotate to a suitable relative position before the image capturing. A method for assembling the sapphire lens 601 is shown in FIG. 6. In FIG. 6, the camera device 60 further includes an annular support 606, where the sapphire lens 601 is installed on. A predetermined space is reserved within the annular support 606, so that the sapphire lens 601 has enough room to rotate. In addition, a screw thread 607 is formed on the outer peripheral wall of the annular support 606, so the annular support 606 is mounted on the camera device 60 by manually screwing the annular support onto the camera device 60.

Figure 7:
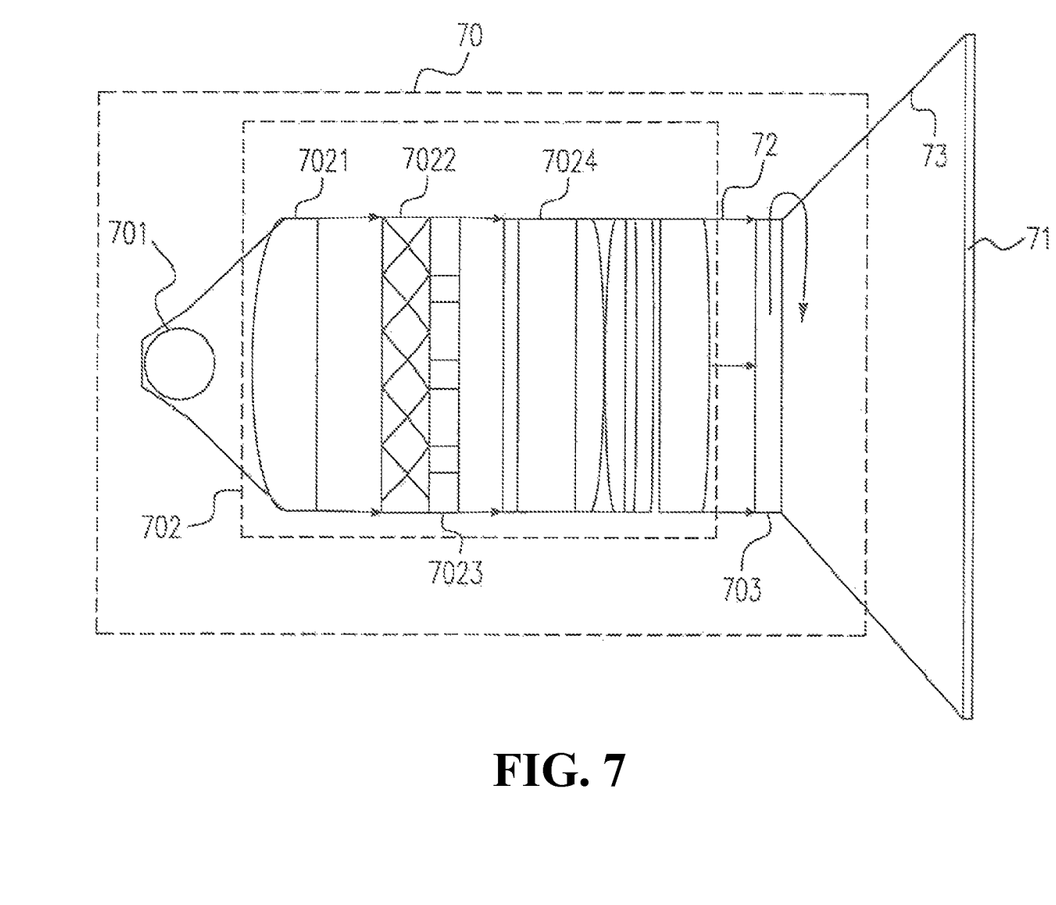
FIG. 7 is a schematic view illustrating a projector device of the present invention.

FIG. 7 is the schematic view illustrating the projector device 70 of the present invention. The projector device 70 includes a light source 701, a lens module 702 and a rotatable protective light window 703. The lens module 702 is illuminated by the light source, thereby generating a working light beam 72. The rotatable protective light window 703 has the birefringence property, and is coupled to the lens module 702 as a light exit window to protect the lens module 702. The working light beam 72 is received by the rotatable protective light window 703, and is refracted into a birefringent light beam 73. The lens module 702 further includes a condensing lens 7021, a liquid crystal layer 7022, a color filter 7023 and an optical lens 7024.

The projector device 70 of the present invention is a digital light processing (DLP) projector device, a liquid crystal on silicon (LCoS) projector device or a liquid crystal display (LCD) projector device.

Similar to the previous embodiments, the rotatable protective light window 703 is a sapphire lens made from a sapphire. The sapphire lens has a crystal structure and a crystal axis, where the crystal structure is a single-crystal structure, and the crystal axis includes one selected from a group consisting of c-axis (0001), a-axis [including (1$\bar{2}$10), (11$\bar{2}$0), (2$\bar{1}\bar{1}$0), ($\bar{1}\bar{1}$20), ($\bar{2}$110) and ($\bar{1}$2$\bar{1}$0)], m-axis [including ($\bar{1}$010), ($\bar{1}$100), (01$\bar{1}$0), (10$\bar{1}$0), (1$\bar{1}$00), and (0$\bar{1}$10)], and r-axis [including (10$\bar{1}$1), ($\bar{1}$01$\bar{1}$), (01$\bar{1}\bar{1}$), (0$\bar{1}$11), (1$\bar{1}$0$\bar{1}$) and r-axis ($\bar{1}$101)].

The projector device 70 further includes an automatic rotating structure (not shown), which enables the rotatable protective light window 703 to automatically rotate. The projector 70 device projects an image 71 with a frame rate, and the rotatable protective light window 703 rotates with a rotational frequency, in which, the rotational frequency depends on the frame rate. Preferably, the rotational frequency is larger or equal to the frame rate. With such configuration, when the image 71 projected by the projector device 70 is stationary, the rotational frequency of the rotatable protective light window is zero. In other words, the rotatable protective light window stops rotating. In addition, the birefringence property of the rotatable protective light window 703, which is a sapphire lens, enhances the resolution of the image 71.

The preferred embodiments described above are disclosed for illustrative purpose but to limit the modifications and variations of the present invention. Thus, any modifications and variations made without departing from the spirit and scope of the invention should still be covered by the scope of this invention as disclosed in the accompanying claims.

What is claimed is:
1. A camera device, comprising:
   a lens module; and
   a birefringent sapphire lens coupled to said lens module to protect said lens module, said sapphire lens having a crystal structure and a crystal axis, wherein said crystal structure is a single-crystal structure and said crystal axis includes one selected from a group consisting of c-axis, a-axis, m-axis and r-axis;
   wherein said c-axis is c-axis (0001), said a-axis is one of the a-axis (1$\bar{2}$10), a-axis (11$\bar{2}$0), a-axis (2$\bar{1}\bar{1}$0), a-axis ($\bar{1}\bar{1}$20), a-axis ($\bar{2}$110) and a-axis ($\bar{1}$2$\bar{1}$0), said m-axis is one of the m-axis ($\bar{1}$010), m-axis ($\bar{1}$100), m-axis (01$\bar{1}$0), m-axis (10$\bar{1}$0), m-axis (1$\bar{1}$00), m-axis (0$\bar{1}$10), said r-axis is one of the r-axis (10$\bar{1}$1), r-axis ($\bar{1}$01$\bar{1}$), r-axis (01$\bar{1}\bar{1}$), r-axis (0$\bar{1}$11), r-axis (1$\bar{1}$0$\bar{1}$) and r-axis ($\bar{1}$101).

2. The camera device as claimed in claim 1, wherein said sapphire lens serves as a light incident window having two optical axes; wherein, when a direction of an incident light entering said sapphire lens is not parallel to any of said two optical axes, said sapphire lens responses to said incident light by refracting said incident light into a first refracted light beam and a second refracted light beam, in which, said c-axis (0001) is one of said two optical axes, and a moiré pattern is eliminated by the birefringent property of said sapphire lens.

3. The camera device as claimed in claim 1, wherein said lens module further includes:
   an optical lens coupled to said sapphire lens in such a manner to receive said first refracted light beam and said second refracted light beam to form two parallel light beams;
   an image sensing unit for transforming said two parallel light beams into an electronic signal;
   an image processing module including:
      a circuit board electrically connected to said image sensing unit; and
      a processor electrically connected to said circuit board for transforming said electronic signal into an image signal;
   the camera device further comprising:
      a flat panel display electrically connected to said circuit board for outputting a display image according to said image signal.

4. The camera device as claimed in claim 1, wherein said sapphire lens defines a rotatable protective light window, and rotatably coupled to said lens module to protect said lens module, wherein, when said rotatable protective light window and said lens module are at a first relative position, said lens module fetches a specific reflected light; and wherein, when said rotatable protective light window and said lens module are at a second relative position, said lens module blocks said specific reflected light.

5. The camera device as claimed in claim 4, wherein said rotatable protective light window is a birefringent lens so said specific reflected light is doubly refracted into an ordinary light and an extraordinary light to enhance resolution of the camera device.

6. The camera device as claimed in claim 4, wherein said sapphire lens includes a first surface and a second surface; the camera device further comprising:
   an anti-reflective coating layer formed on said first surface, in which, materials of said anti-reflective coating layer include a first semiconductor metal oxide;
   an infrared filter formed on said second surface, in which, materials of said infrared filter includes a second semiconductor metal oxide; wherein, said first semiconductor metal oxide includes silica and titanium dioxide and said second semiconductor metal oxide includes silica, vanadium pentoxide, and tantalum pentoxide; and said lens module further including a step motor for driving said rotatable protective light window to rotate so as to block said specific light or to permit the specific light pass through said rotatable protective light window.

7. A projector device, comprising:
a light source;
a lens module illuminated by said light source to generate a working light beam; and
a birefringent rotatable protective light window coupled to said lens module to protect said lens module and serving as a light exit window to generate a pair of birefringent light beams by receiving said working light beam, said rotatable protective light window having a crystal structure and a crystal axis, wherein said crystal structure is a single-crystal structure and said crystal axis includes one selected from a group consisting of c-axis, a-axis, m-axis and r-axis;
wherein said c-axis is c-axis (0001), said a-axis is one of the a-axis ($1\bar{2}10$), a-axis ($11\bar{2}0$), a-axis ($2\bar{1}\bar{1}0$), a-axis ($\bar{1}\bar{1}20$), a-axis ($\bar{2}110$) and a-axis ($\bar{1}2\bar{1}0$), said m-axis is one of the m-axis ($\bar{1}010$), m-axis ($\bar{1}100$), m-axis ($01\bar{1}0$), m-axis ($10\bar{1}0$), m-axis ($1\bar{1}00$), m-axis ($0\bar{1}10$), said r-axis is one of the r-axis ($10\bar{1}1$), r-axis ($\bar{1}01\bar{1}$), r-axis ($0\bar{1}11$), r-axis ($0\bar{1}11$), r-axis ($1\bar{1}0\bar{1}$) and r-axis ($\bar{1}101$).

8. The projector device as claimed in claim 7, wherein, said lens module includes a condensing lens, a liquid crystal layer, a color filter and a optical lens; and the projector device is a digital light processing (DLP) projector device, a liquid crystal on silicon (LCoS) projector device, or a liquid crystal display (LCD) projector device.

9. The projector device as claimed in claim 7, further comprising:
an automatic rotating structure, which enables said rotatable protective light window to rotate automatically;
wherein, the projector device is adapted to project an image with a frame rate, and wherein, said rotatable protective light window rotates with a rotational frequency, in which, said rotational frequency depends on said frame rate, said rotational frequency is greater than or equal to said frame rate, and resolution of said image is enhanced by birefringence property of said rotatable protective light window.

\* \* \* \* \*

UNITED STATES PATENT AND TRADEMARK OFFICE
CERTIFICATE OF CORRECTION

PATENT NO.        : 8,885,086 B2                                    Page 1 of 1
APPLICATION NO.   : 13/794672
DATED             : November 11, 2014
INVENTOR(S)       : Wei-Hsiang Wang et al.

It is certified that error appears in the above-identified patent and that said Letters Patent is hereby corrected as shown below:

In the Claims

On col. 10, line 1, claim 6: change "r-axis $(0\bar{1}11)$" to --r-axis $(01\bar{1}\bar{1})$--

Signed and Sealed this
Seventeenth Day of March, 2015

Michelle K. Lee
*Director of the United States Patent and Trademark Office*

UNITED STATES PATENT AND TRADEMARK OFFICE
CERTIFICATE OF CORRECTION

PATENT NO.        : 8,885,086 B2
APPLICATION NO.   : 13/794672
DATED             : November 11, 2014
INVENTOR(S)       : Wei-Hsiang Wang et al.

It is certified that error appears in the above-identified patent and that said Letters Patent is hereby corrected as shown below:

In the Claims

On col. 10, line 1, claim 7: change "r-axis (0111)" to --r-axis (01$\bar{1}$1)--

This certificate supersedes the Certificate of Correction issued March 17, 2015.

Signed and Sealed this
Twenty-third Day of June, 2015

Michelle K. Lee
*Director of the United States Patent and Trademark Office*